Nov. 2, 1965   H. N. PAULENCU   3,215,188
BURNER
Filed June 21, 1963
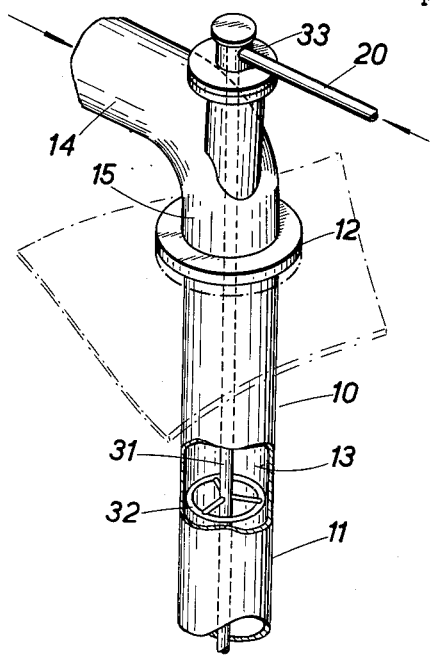
FIG.1
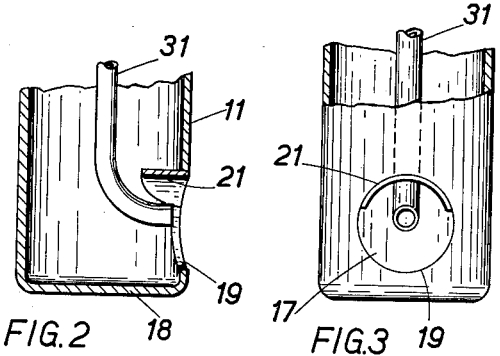
FIG.2   FIG.3
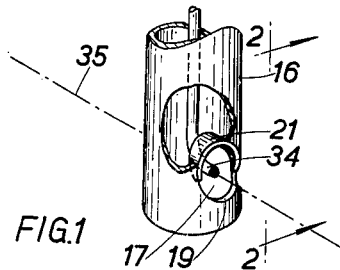
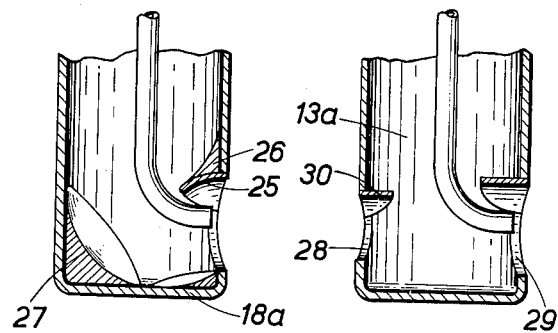
FIG.4   FIG.5   FIG.7
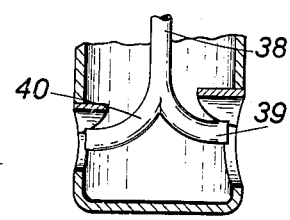
FIG.6
INVENTOR
Henry Nicholas
    Paulencu.
By Arne J. Fors
      AGENT.

United States Patent Office 3,215,188
Patented Nov. 2, 1965

1

3,215,188
BURNER
Henry N. Paulencu, Hamilton, Ontario, Canada, assignor to The Steel Company of Canada, Limited, Hamilton, Ontario, Canada, a company of Canada
Filed June 21, 1963, Ser. No. 289,671
16 Claims. (Cl. 158—99)

This invention relates to an improved burner of the type used to supply fluids such as liquid and gaseous fuel, air and supplemental reactants to reactor vessels. It is particularly directed to an improved burner for rotary kiln type reactors wherein a directional flow of supplied fluids is desirable.

Processes are known for the reduction of iron oxide to metallic iron by direct reduction in a rotary kiln type furnace with a reducing agent at a temperature below the melting point of metallic iron, and usually, that of ferric oxide. Difficulties have been encountered in the operation of the rotary kiln which have adversely affected its use in the reduction of iron oxide as a practical, economic, commercial scale operation. One major difficulty has been the adhesion of particles of the charge to the interior wall of the reactor to form an annular ring, with the consequent restriction of the capacity of the reactor and of the free flow of charge mixture and reaction product therethrough. This difficulty has been found to be due, in large measure, to the tendency of the burners provided at spaced intervals along the length of the furnace to discharge their blast in a direction in which it impinges on the reactor wall rather than in a path coaxial with said reactor wall. The direct result is the localized fusion of portions of the charge and the formation and further enlargement of accretions on the reactor wall.

One means of accomplishing the substantially coaxial emission of combustible gases and thereby obviating the difficulty of the creation of accretions on the reactor walls has been to provide the burner with a nozzle which is positioned at right angles to the body of the burner. Certain structural disadvantages are involved in resorting to this expedient. One objection is that a substantially large opening must be provided in the shell and brickwork of the kiln in order that the burner can be readily installed or removed for servicing or replacement. The large openings formed in the kiln shell and brickwork have been found to weaken the structural strength of the kiln, thereby shortening the effective life of the structure. A further disadvantage is that ignition of the combustible gases tends to occur within the nozzle itself, thereby bringing about rapid deterioration of the nozzle, necessitating its replacement, as well as causing a blast emission which impinges on the kiln wall.

Accordingly, it is an important object of the present invention to provide an improved burner which emits a blast substantially parallel with a wall of the reactor.

It is a further important object of the invention to provide an improved burner which discharges a fluid into the kiln substantially coaxial with the reactor wall without resorting to the use of an external nozzle and without appreciably diminishing the flow capacity of the burner.

These and other objects and advantages of the present invention will become apparent as the description proceeds.

2

In general, the invention is achieved by the provision, in combination with a burner of generally tubular construction adapted to extend from a point external of a kiln-type reactor of substantially cylindrical construction and terminate in a discharge outlet internal of the kiln and means for controllably supplying combustible gases or other fluids to said burner, of an opening in said burner adjacent the end thereof disposed within said reactor in substantial alignment with the long axis of said reactor, deflector means mounted adjacent said opening and projecting inwardly thereof a predetermined distance to divert said combustible gases from flow longitudinally of said burner to flow transversely thereof through said opening in a path substantially corresponding with said long axis of said reactor.

It will be understood, however, that the description of the present invention with relation to rotary kiln-type reactors is by way of illustration only and not limited thereto, and that the present invention can be employed to advantage in reactor vessels such as roasters, driers, calcinators, shaft kilns and the like.

An understanding of the present burner can be obtained from the following description, reference being made to the accompanying drawing, in which:

FIGURE 1 is a perspective view, partly cut away, of a burner which incorporates the improved construction of this invention;

FIGURE 2 is a section taken along line 2—2 of FIGURE 1;

FIGURE 3 is a front elevation of the portion of the burner illustrated in FIGURE 1;

FIGURE 4 is a side sectional view of a modification of the burner of the invention;

FIGURE 5 is a vertical sectional view of a further embodiment of the burner of the present invention;

FIGURE 6 is a graphical illustration of the operation of a burner of the present invention; and FIGURE 7 is a vertical sectional view of still another embodiment of the present invention.

Like reference characters refer to like parts throughout the description and the drawing.

The burner embodiments illustrated in the drawing are adapted for use with reactor vessels such as elongated rotary kiln-type reactors, not shown. In the operation of rotary kiln-type reactors, a charge mixture, which may be comprised of iron oxide pellets, solid carbonaceous material and flux is fed from a source of supply, such as a feed hopper, through a feed chute to the feed end of the kiln.

The kiln is of circular section and is formed of an outer steel shell and an inner lining of refractory material, such as, for example, fire clay, magnesite, chrome or the like. The kiln is supported on trunnions rotated at a predetermined number of revolutions per minute such as by a motor through a train of speed reducing gears, the final one of which is meshed with a ring gear secured around the shell. The kiln can be mounted in a horizontal plane with provision, such as baffles, not shown, for advancing the charge from the feed end to the discharge end; or it can be mounted at an angle of the order, for example, of from 3° to 4° to the horizontal, to cause the charge mixture to flow by gravity from the feed end to the discharge end.

Referring now to FIGURE 1, the numeral 10 designates a burner of this invention having a tubular outer casing 11. Integrally formed with the casing 11 is a circular flange portion 12 for mounting the burner 10 on the kiln shell. Air under pressure is introduced to chamber 13 of burner 10 through tubing 14 and elbow 15 which is flanged for removable mounting on flange 12 of casing 11. The rate of flow of air to the burner can be controlled by a valve, not shown.

A preferably circular opening 17 is formed in the casing side wall 16 in proximity to the casing end wall 18. The lower edge 19 of opening 17 preferably is located above end wall 18 a distance less than the diameter of opening 17 and a distance at least equal to a half the radius of opening 17. The diameter of opening 17 preferably is about two-thirds to about three-quarters the diameter of the casing chamber 13. An opening diameter less than about two-thirds the diameter of chamber 13 results in an impeded flow of fluid through the casing and a loss of efficiency whereas a diameter greater than about three-quarters the diameter of chamber 13 results in an undesirable lateral spread of the blast pattern as will be described hereinbelow with reference to FIGURE 6.

A deflector 21 secured to casing 11 adjacent the upstream side of opening 17 is adapted to assume the curvature of said opening and extend inwardly into chamber 13 a distance equal to about one-third the diameter of chamber 13; that is, a distance substantially equal to about seven-eighths of the radius of opening 17.

In the embodiment of the invention illustrated by FIGURE 4, the deflector 25 is curved concave outwardly and the upstream side of the deflector streamlined by the attachment of a shaped metal liner 26 thereto. The closed end of the casing is likewise streamlined by the attachment of a shaped liner 27 to end wall 18a. In the embodiment illustrated by FIGURE 5, a second circular wall opening 28 is formed in the side wall diametrically opposed to and coaxial with main opening 29. Opening 28 preferably has a smaller diameter than opening 29 and has a deflector 30 attached adjacent to it which projects into chamber 13a a distance substantially equal to the radius of opening 28.

In the above embodiments adapted for use in rotary kiln type furnaces, it is desirable to add a combustible fuel such as, for example, natural gas, oil, coal or coke fines or the like to the air introduced into the kiln. Accordingly, a tube 31 preferably is concentrically mounted within casing 11 by means of a centering ring 32. Tube 31 is supplied with fuel by supply line 20 which is connected thereto by means of a flanged coupling 33 or the like connecting mechanism well known in the art. The discharge end 34 of tube 31 is turned at a right angle to its longitudinal axis such that it is concentrically aligned with opening 17. The center of opening 17 and the axis of the end 34 of tube 31 preferably are concentrically aligned and coaxial with the center-line of the furnace, as indicated by numeral 35.

In the embodiment illustrated in FIGURE 7, tube 38 is forked such that the fluid reactant flowing through tube 38 is divided and discharges in opposite directions along the center-line 35 of the furnace. The desired division of reactant flow through outlets 39 and 40 can be predetermined by control of the effective diameters of the respective outlets. That is, the division of flow of the reactant through outlets 39 and 40 can be controlled by the ratio of diameters of outlet 39 relative to outlet 40.

In the operation of my invention as described specifically with reference to the first embodiment above, air under pressure is introduced into the burner through tubing 14 and casing chamber 13 and discharges into the furnace through casing opening 17. At the same time, a combustible fuel, such as natural gas, is introduced into the furnace through tubing 31. The air and fuel are not mixed until discharged from the burner into the combustion zone of the furnace at which point ignition is effected.

FIGURE 6 illustrates graphically the distribution of an air blast emitted by a test burner according to the structure illustrated by FIGURES 1, 2 and 3; tube 31 being removed during the test.

The dimensions of the burner were as follows: the casing chamber 13 diameter—about 4 inches; the wall opening 17 diameter—about 2.8 inches; the lower edge 19 of the wall opening—about 1.0 inch from the end wall 18; and the deflector 21 inward projection—about 1.2 inches into the casing chamber 13 from the outer side of casing wall 16.

Air under pressure was introduced into the casing by way of tube 14 and discharged therefrom through the discharge opening 17 at a rate of about 450 cubic feet per minute. A sensitive pressure indicator was employed to detect the zones of intense air blast 40 and the peripheral air blast 41. The X and the Y scales of the graph are measured in feet.

It will be apparent that the zone of intense air blast 40 was maintained within a spread of 2 feet for over 5 feet of travel and the peripheral air blast 41 maintained within a spread of 2½ feet for about 4 feet of travel with the center-line of the blast substantially aligned with a line drawn through the center of discharge opening 17 perpendicular to the longitudinal axis of the burner.

In industrial practice, of course, the size of the burner will vary according to the use to which the apparatus is applied and to the size of the vessel in which it is installed; rotary kiln burners normally being larger than the test burner described hereinabove. Aerodynamically the behaviour or performance of burners according to the present invention will function in like manner regardless of the size, the preferred dimensions of larger burners being obtained by extrapolation of the dimensions of the above test burner.

As a matter of aerodynamic theory, it has been established as a general rule that where there is flow in a given direction in a passage and it is desired that such flow be diverted, then in order to effect the change of direction desired, there must be travel within such passage in the desired direction of a distance of at least one passage diameter. It will be appreciated that, in the structure disclosed, no difficulty is presented in changing the direction of flow of a fluid in tube 31 which is turned through 90°. However, in the case of changing the direction of the flow of air discharging from casing 11, it has heretofore been necessary to provide an external appendage or nozzle to direct the blast in the direction desired. It has been found that through the use of deflector 21 as has been described hereinabove, a change in direction of flow of substantially 90° can be achieved with high flow capacity and with minimum pressure drop.

The present invention provides a number of important advantages. The blast distribution pattern of a fluid introduced into a reactor vessel can be closely controlled and directed thereby precluding the impingement of the blast on the reactor wall or walls. The improved burner structure obviates the requirement for an externally projecting burner appendage thus reducing the diameter of vessel wall opening normally required while facilitating the removal of the burner from the vessel for servicing or replacement. In addition, the burner permits a high flow of fluid therethrough with an attendant low static line pressure.

It will be understood, of course, that modifications can be made in the preferred embodiments of the invention described and illustrated herein without departing from the scope of the invention as defined by the appended claims.

What I claim as new and desire to protect by Letters Patent of the United States is:

1. An apparatus of the class described for use in a reactor vessel which comprises a tubular casing closed at one end and open at the opposite end adapted to extend through the vessel wall from a point external of the vessel to a point internal of said vessel, means formed at the open end of the casing for supporting said casing on the vessel wall, said casing having a circular opening formed in its side wall at a point in proximity to the internally projecting closed end of the casing, and arcuate deflector means formed adjacent said opening on its upstream side secured to and projecting inwardly from said casing side wall so constructed and arranged to co-operate with the closed end of the casing for diverting the fluid flowing through and exhausting from the casing from a direction parallel to the long axis of the casing to a direction substantially perpendicular to the long axis of the casing.

2. An improved burner of the type used in a reactor vessel which comprises an elongated tubular casing having a closed end defining a chamber adapted to be inserted into said vessel and an end adapted to project externally from said vessel, means for securing said casing to said vessel, conduit means for supplying a fluid to said casing, said casing having a circular opening formed in its side wall in proximity to the closed end of the casing, and an arcuate deflector plate formed adjacent said opening on its upstream side secured to and projecting inwardly a predetermined distance from the casing side wall such that the direction of flow of fluid passing through and discharging from said casing is diverted from a direction parallel to the longitudinal axis of the casing to a direction substantially perpendicular to the longitudinal axis of said casing.

3. An improved burner as claimed in claim 2 in which said casing side wall circular opening has a diameter about two-thirds to about three-quarters the diameter of the casing and is located a distance from the closed end of the casing no more than the diameter of the said casing opening and no less than one-half the radius of the said casing opening, said arcuate deflector plate projecting inwardly from the casing side wall into said casing chamber a distance of about seven-eighths the radius of the said casing opening.

4. An improved burner as claimed in claim 3 in which an elongated tube connectable to a fluid supply is disposed longitudinally within the casing substantially concentric therewith and is turned at one end at right angles for concentric alignment of the said tube end with the casing circular wall opening, said tube end being terminated at a point substantially co-planar with the casing wall.

5. An improved burner as claimed in claim 3 in which an elongated tube connectable to a fluid supply is disposed longitudinally within the casing substantially concentric therewith and is turned at one end at right angles for concentric alignment of the said tube end with the casing circular opening, said tube end being terminated at a point substantially co-planar with the casing wall, the fluid introduced to said casing being air and the fluid supplied to said tube being a combustible material.

6. An improved burner of the type used in a kiln-type cylindrical reactor vessel for introducing fluid reactants into said reactor vessel in a direction substantially co-axial with the longitudinal axis of the vessel comprising in combination, an elongated tubular casing having a closed end defining a chamber adapted to be inserted into said vessel through an opening formed in the vessel wall and an open end adapted to be secured to said vessel wall, said casing having a substantially circular opening formed in its side wall in proximity to its closed end and substantially concentric with the longitudinal axis of the vessel, and an arcuate deflector secured to the casing side wall adjacent to the casing wall opening on its upstream side such that said deflector projects inwardly a predetermined distance into the casing chamber from said side wall for diverting the fluid flowing through and discharging from the casing from a direction substantially parallel to the longitudinal axis of the casing to a direction substantially perpendicular to the casing longitudinal axis and co-axial with the longitudinal axis of the vessel.

7. An improved burner as claimed in claim 6 in which an elongated tube connectable to a fluid supply is disposed longitudinally within the casing substantially concentric therewith and is turned at one end at right angles for concentric alignment of the said tube end with the casing wall opening, said tube end being terminated at a point substantially co-planar with the casing wall.

8. An improved burner as claimed in claim 6 in which an elongated tube connectable to a fluid supply is disposed longitudinally within the casing substantially concentric therewith and is turned at one end at right angles for concentric alignment of the said tube end with the casing opening, said tube end being terminated at a point substantially co-planar with the casing wall, the fluid introduced to said casing being air and the fluid supplied to said tube being a combustible material.

9. An improved profile burner as claimed in claim 8 in which said casing side wall opening has a diameter about two-thirds to about three-quarters the diameter of the casing and is located a distance from the closed end of the casing no more than the diameter of the said casing opening and no less than one-half the radius of the said casing opening, said deflector plate projecting inwardly into said casing chamber from the casing side wall a distance of about seven-eighths the radius of the said casing opening.

10. An improved burner as claimed in claim 9 in which the deflector is concave outwardly and means are secured to the inside of the casing wall for streamlining the interior of said casing to minimize the resistance to the flow of fluids therethrough.

11. An improved burner as claimed in claim 9 in which said casing has a second circular opening formed in its side wall substantially diametrically opposed to and concentric with the first mentioned opening.

12. An improved burner as claimed in claim 11 in which a second arcuate deflector is secured to the casing side wall adjacent the second wall opening on its upstream side such that a portion of the fluid flowing through the casing is discharged in a direction substantially opposite to the direction of discharge of the fluid discharging from the first wall opening.

13. An improved burner as claimed in claim 12 in which said second arcuate deflector projects into said casing chamber from said casing side wall a distance equal to about seven-eighths the radius of the second wall opening.

14. An improved burner of the type used in a kiln-type cylindrical reactor vessel for introducing fluid reactants into said reactor vessel in a direction substantially co-axial with the longitudinal axis of the vessel comprising, in combination, an elongated tubular casing having a closed end defining a chamber adapted to be inserted into said vessel through an opening formed in the vessel wall and an open end adapted to be secured to said vessel wall, said casing having a pair of substantially circular openings formed in its side wall in proximity to its closed end and substantially concentric with the longitudinal axis, arcuate deflectors secured to the casing wall adjacent to the casing wall openings on their upstream sides such that said deflectors project inwardly into the casing chamber a predetermined distance from the casing side wall substantially normal to said casing side wall for diverting the fluid flowing through and discharging from the casing from a direction substantially parallel to the longitudinal axis of the casing to directions substantially perpendicular to the casing longitudinal axis and co-axial with the longitudinal axis of the vessel, and an elongated tube connectable to a fluid supply disposed longitudinally within the casing substantially concentric therewith, said tube having a pair of outlets each turned through about 90° such that each outlet faces in the opposite direction and is concentrically aligned with a casing wall opening.

15. An improved burner as claimed in claim 14 in which one casing wall opening has a diameter about two-thirds to about three-quarters the diameter of the casing and is located a distance from the closed end of the casing no more than the diameter of the said casing opening and no less than one-half the radius of the said casing opening, the corresponding deflector plate projecting inwardly into said casing chamber a distance of about seven-eighths the radius of the said casing opening.

16. An improved burner as claimed in claim 15 in which thet second deflector plate projects into the casing chamber a distance of about seven-eighths the radius of the second casing wall opening.

References Cited by the Examiner

UNITED STATES PATENTS

| 2,244,821 | 6/41 | Bloom | 158—99 |
| 2,333,531 | 11/43 | Ferguson. | |
| 2,380,463 | 7/45 | Poole | 158—1.5 X |
| 2,560,223 | 7/51 | Hanzalek | 158—1.5 X |

FOREIGN PATENTS

| 961,324 | 11/49 | France. |
| 652 | 1/13 | Great Britain. |
| 174,699 | 1/22 | Great Britain. |
| 238,108 | 3/26 | Italy. |

JAMES W. WESTHAVER, *Primary Examiner.*

FREDERICK L. MATTESON, JR., *Examiner.*